(12) United States Patent
Funakoshi et al.

(10) Patent No.: US 8,868,407 B2
(45) Date of Patent: Oct. 21, 2014

(54) LANGUAGE PROCESSOR (75) Inventors: Kotaro Funakoshi, Wako (JP); Mikio Nakano, Wako (JP); Takenobu Tokunaga, Tokyo (JP); Ryu Iida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 13/531,682

(22) Filed: Jun. 25, 2012

(65) Prior Publication Data

US 2013/0013290 A1    Jan. 10, 2013

Related U.S. Application Data

(60) Provisional application No. 61/504,825, filed on Jul. 6, 2011.

(30) Foreign Application Priority Data

May 11, 2012    (JP) ................................. 2012-110061

(51) Int. Cl.
G06F 17/27    (2006.01)

(52) U.S. Cl.
USPC ................................. 704/9; 704/257; 704/255

(58) Field of Classification Search
USPC ............... 704/1–10, 235, 251, 255, 257, 277, 704/254, 270
See application file for complete search history.

(56) References Cited

U.S. PATENT DOCUMENTS 8,175,873 B2 * 5/2012 Di Fabbrizio et al. ........ 704/235
2010/0161316 A1 * 6/2010 Haug ................................ 704/9

FOREIGN PATENT DOCUMENTS

JP    2010-224536 A    10/2010

OTHER PUBLICATIONS

Salmon-Alt, Susanne et al., "Generating Referring Expressions in Multimodal Contexts", International Natural Language Generation Conference, 2000, 8 pages.
Salmon-Alt, Susanne et al., "Reference Resolution within the Framework of Cognitive Grammar", Cognitive Science Quarterly, 2000, 25 pages.
Denis, Alexandre et al., "Generating Referring Expressions with Reference Domain Theory", INLG, version 1, Jul. 14, 2010, 9 pages.
Thorisson, Fristinn R., "Simulated Perceptual Grouping: An Application to Human-Computer Interaction", Proceedings of the Sixteenth Annual Conference of the Cognitive Science Society, Atlanta, Georgia, Aug. 13-16, 1994, pp. 876-881.
Spanger, Philipp et al., "REX:J: Japanese Referring Expression Corpus of Situated Dialogs", Springer Science +Businhess Media B.V. Dec. 4, 2010, 31 pages.

(Continued)

*Primary Examiner* — Huyen X. Vo
(74) *Attorney, Agent, or Firm* — Squire Patton Boggs (US) LLP (57) ABSTRACT

A referring expression processor which uses a probabilistic model and in which referring expressions including descriptive, anaphoric and deictic expressions are understood and generated in the course of dialogue is provided. The referring expression processor according to the present invention includes: a referring expression processing section which performs at least one of understanding and generation of referring expressions using a probabilistic model constructed with a referring expression Bayesian network, each referring expression Bayesian network representing relationships between a reference domain (D) which is a set of possible referents, a referent (X) in the reference domain, a concept (C) concerning the referent and a word (W) which represents the concept; and a memory which stores data necessary for constructing the referring expression Bayesian network.

7 Claims, 8 Drawing Sheets

(56) References Cited

OTHER PUBLICATIONS

Iida, Ryu et al., "Incorporating Extra-Linguistic Information into Reference Resolution in Collaborative Task Dialogue", Proceeding of the 48th Annual Meeting of the Association for Computational Linguistics, Jul. 11-16, 2010, pp. 1259-1267.
Joachims, Thorsten, "Training Linear SVMs in Linear Time", KDD'06, Aug. 20-23, 2006, 10 pages.

* cited by examiner

| CONCEPT | WORDS |
|---|---|
| OBJ | THING , ONE |
| FIG | FIGURE , SHAPE |
| TRI | TRIANGLE , RIGHT TRIANGLE |
| SQR | QUADRATE , SQUARE , REGULAR TETRAGON |

FIG. 10

| CONCEPT | (1) | (2) | (3) | (4) | (5) | (6) | (7) |
|---|---|---|---|---|---|---|---|
| OBJ | 1 | 1 | 1 | 1 | 1 | 1 | 1 |
| FIG | 0.3 | 0.3 | 0.3 | 0.3 | 0.3 | 0.3 | 0.3 |
| TRI | 1 | 1 | 1 | 1 | 1 | 0 | 0 |
| SQR | 0 | 0 | 0 | 0 | 0 | 1 | 0.8 |

FIG. 11

LANGUAGE PROCESSOR

BACKGROUND OF THE INVENTION

1. Field of the Invention

The present invention relates to a referring expression processor for processing referring expressions, a language processor including the referring expression processor and a referring expression processing method.

2. Background Art

Assume that a robot communicates with a person using a speech dialogue system or the like. Assume that there exit a plurality of desks and a plurality of chairs in a room and a person specifies a desk by a referring expression "the white desk with red legs". Referring expressions are language expressions intended by speakers to pointing at specific entities of interest to hearers. Operation of a language processor of a robot for identifying the desk specified by a person based on the referring expression is referred to as understanding of referring expressions. Operation of the language processor of the robot for generating referring expressions which represent the desk specified by the robot and which is easily understandable by persons in order to make a person identify the desk is referred to as generation of referring expressions. Referring expressions made by persons as a matter of course depend on knowledge of the persons. Accordingly, the language processor has to utilize data on knowledge of persons when carrying out understanding and generation of referring expressions.

A probabilistic model can be used by the language processor to utilize data on knowledge of persons when carrying out understanding and generation of referring expressions.

JP2010-224536A filed by Honda Motor discloses a language processor which handles referring expressions for referring to portions of an object and a probability calculating method used in language processing by the language processor.

However, JP2010-224536A does not disclose a mechanism by which referring expressions including descriptive, anaphoric and deictic expressions are understood and generated in the course of dialogue.

Accordingly, there is a need for a referring expression processor for processing referring expressions, a language processor including the referring expression processor and a referring expression processing method which use a probabilistic model and in which referring expressions including descriptive, anaphoric and deictic expressions are understood and generated in the course of dialogue.

SUMMARY OF THE INVENTION

A referring expression processor according to the first aspect of the invention includes: a referring expression processing section which performs at least one of understanding and generation of referring expressions using a probabilistic model constructed with a referring expression Bayesian network, each referring expression Bayesian network representing relationships between a reference domain (D) which is a set of possible referents, a referent (X) in the reference domain, a concept (C) concerning the referent and a word (W) which represents the concept; and a memory which stores data necessary for constructing the referring expression Bayesian network.

The referring expression processor according to the present aspect uses a probabilistic model constructed with a referring expression Bayesian network, each referring expression Bayesian network representing relationships between a reference domain (D) which is a set of possible referents, a referent (X) in the reference domain, a concept (C) concerning the referent and a word (W) which represents the concept. Accordingly, referring expressions including descriptive, deictic or anaphoric expressions can be understood and generated by the referring expression processor. Further, each referring expression Bayesian network includes a reference domain (D) which is a set of possible referents, and therefore referring expressions can be processed according to the circumstances by the referring expression processor.

In a referring expression processor according to one embodiment of the present invention, each referring expression Bayesian network is constructed in the course of dialogue each time a referring expression is processed.

By the referring expression processor according to the present embodiment, a referring expression can be processed according to development of the dialogue.

In a referring expression processor according to another embodiment of the present invention, a way of determining the reference domain is changed depending on types of referring expressions.

By the referring expression processor according to the present embodiment, a referring expression can be processed with a higher accuracy by taking types of referring expressions into consideration.

In a referring expression processor according to another embodiment of the present invention, the reference domain is determined to include all elements (possible referents) when a referring expression contains a demonstrative.

By the referring expression processor according to the present embodiment, a referring expression can be processed with a higher accuracy by considering a single reference domain which includes all elements when the referring expression contains a demonstrative.

In a referring expression processor according to another embodiment of the present invention, a plurality of prediction models for reference domains which have saliency as a parameter are constructed and one of the plurality of prediction models is selected for use depending on whether a referring expression refers to a single entity or a set of entities.

By the referring expression processor according to the present embodiment, a referring expression can be processed with a higher accuracy by selecting one of the plurality of prediction models for use depending on whether a referring expression refers to a single entity or a set of entities.

A language processor according to the second aspect of the present invention includes a referring expression processor according to the present invention.

The language processor according to the resent aspect includes a referring expression processor according to the present invention and therefore it can process a referring expression with a higher accuracy as described above.

A method for processing a referring expression according to the third aspect of the present invention, includes the steps of constructing, by a referring expression processing section of a language processor, a referring expression Bayesian network representing relationships between a reference domain (D) which is a set of possible referents, a referent (X) in the reference domain, a concept (C) concerning the referent and a word (W) which represents the concept using data stored in a memory; obtaining, by the referring expression processing section, a probability $$P(X|D)$$

by marginaliazing the referring expression Bayesian network; and obtaining, by the referring expression processing section, x' which maximizes $$P(X|D)$$

to select x' as the referent of the referring expression.

The method for processing a referring expression according to the present aspect uses a referring expression Bayesian network representing relationships between a reference domain (D) which is a set of possible referents, a referent (X) in the reference domain, a concept (C) concerning the referent and a word (W) which represents the concept. Accordingly, referring expressions including descriptive, deictic or anaphoric expressions can be understood and generated by the method. Further, each referring expression Bayesian network includes a reference domain (D) which is a set of possible referents, and therefore referring expressions can be processed according to the circumstances by the method.

BRIEF DESCRIPTION OF THE DRAWINGS

FIG. 11 is a flowchart showing a method in which $$P(D)$$

is obtained using the list of reference domains.

DETAILED DESCRIPTION

Figure 1:
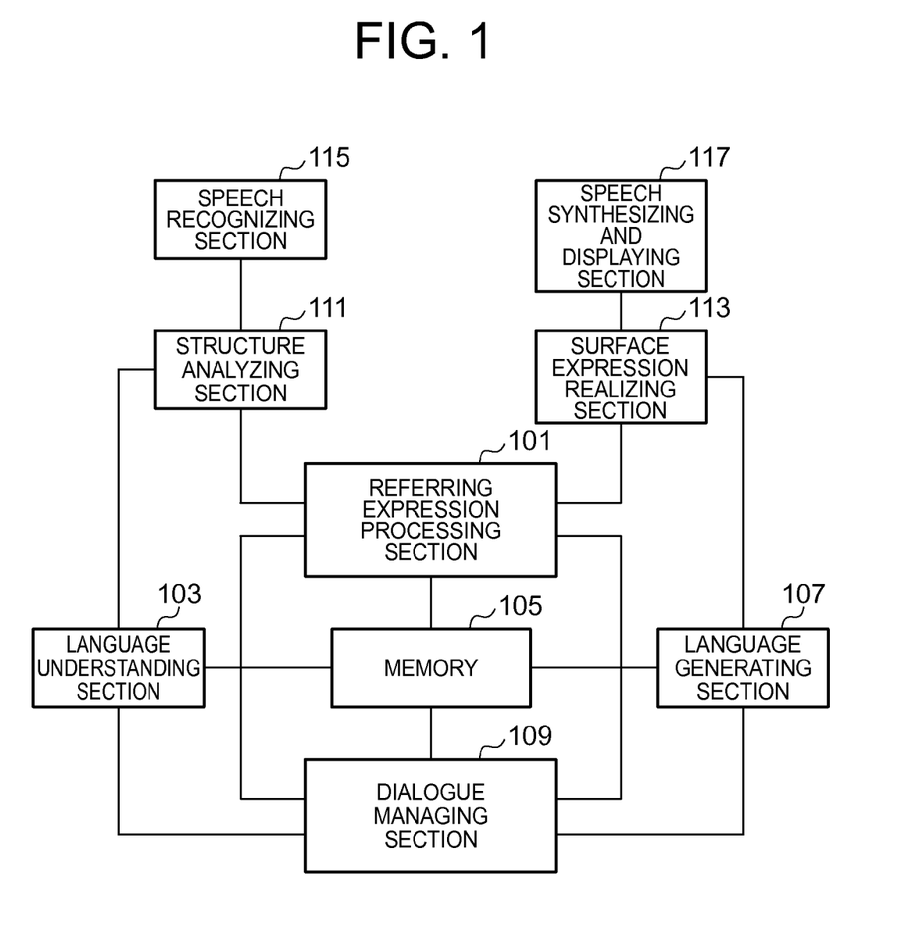
FIG. 1 shows a configuration of a language processor according to an embodiment of the present invention.

FIG. 1 shows a configuration of a language processor 100 according to an embodiment of the present invention. The language processor 100 may include a single processor or a plurality of processors and a single memory or a plurality of memories.

The language processor 100 is provided with a referring expression processing section 101 and a memory 105 as characteristic elements.

The referring expression processing section 101 is provided with a probabilistic model used to calculate a probability that a reference expression represents a candidate referent. The memory 105 stores data used by the probabilistic model. The referring expression processing section 101 updates the probabilistic model in the course of dialogue. When understanding a reference expression, that is, when identifying the referent indicated by the reference expression, the referring expression processing section 101 calculates probabilities that the reference expression represents candidate referents and regards the referent which shows the maximum probability as the referent indicated by the reference expression. Further, when generating a reference expression, that is, when selecting a referring expression that represents a referent, the referring expression processing section 101 calculates probabilities that candidate reference expressions represent the referent and selects the referring expression which shows the maximum probability as the reference expression which represents the referent. The referring expression processing section 101 and the memory 105 constitute a referring expression processor. The components of the referring expression processor will be described in detail later.

A speech recognition section 115 recognizes human speech, divides the speech into morphemes which are the smallest elements of the language and determines parts of speech of the morphemes using a dictionary, for example. A structure analyzing section 111 analyzes a sentence structure based on information of morphemes obtained by the speech recognition section 115.

A surface expression realizing section 113 generates an expression of natural language including a referring expression which has been generated by the referring expression processing section 101. A speech synthesizing and displaying section 117 performs speech synthesis of the expression of natural language or displays the expression of natural language.

The language processor further includes a language understanding section 103, a language generating section 107 and a dialogue managing section 109. The language understanding section 103 receives the results of structure analysis from the structure analyzing section 111, performs processing for understanding language except processing of referring expressions performed by the referring expression processing section 101 and sends the results to the dialogue managing section 109. The language generating section 107 performs processing for generating language except generation of referring expressions performed by the referring expression processing section 101 and sends the results to the surface expression realizing section 113. The dialogue managing section 109 receives from the referring expression processing section 101 referents which referring expressions indicate, receives from the language understanding section 103 the results of processing for understanding language except processing of referring expressions performed by the referring expression processing section 101 and performs processing of the received inputs. The dialogue managing section 109 generates outputs based on the inputs and other conditions and sends the outputs to the referring expression processing section 101 and the language generating section 107. The referring expression processing section 101 receives the outputs of the dialogue managing section 109 and generates a proper referring expression. The language generating section 107 receives the outputs of the dialogue managing section 109 and performs processing for generating language except generation of referring expressions performed by the referring expression processing section 101.

Here, the probabilistic model used by the referring expression processing section 101 will be described. The probabilistic model uses referring expression Bayesian networks.

Figure 2:
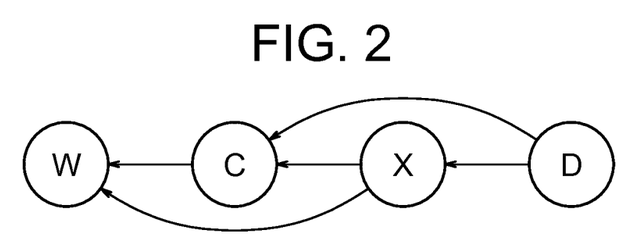
FIG. 2 shows the fundamental network structure of referring expression Bayesian networks.

FIG. 2 shows the fundamental network structure of referring expression Bayesian networks. The four nodes W, C, X and D represent an observed word, the concept denoted by the word the referent of the referring expression, and the presupposed reference domain, respectively. A word means an entry in a concept dictionary which will be described later.

Reference domains (Susan Salmon-Art and Laurent Romary. 2000. Generating referring expressions in multimodal context. In Proceedings of the INLG 2000 workshop on Conference in Generated Multimedia, Mitzpe Ramon, Israel, June; Susan Salmon-Art and Laurent Romary. 2001. Reference resolution within the framework of cognitive grammar. In Proceedings of the International Colloquium on Cognitive Science, San Sabastian, Spain, May; and Alexandre Dennis. 2010. Generating referring expressions with reference domain theory. In Proceedings of the 6$^{th}$ International Natural Language Generating Conference (INLG), pages 27-35) will be described. Each reference domain is a set which includes referents. An entity included in a reference domain can be either an individual entity or another reference domain. Each reference domain d has its focus and degree of saliency (a non-negative real number). The focus and degree of saliency are denoted as foc(d) and sal(d), respectively. Reference domains are sorted in descending order according to saliency.

Figure 5:
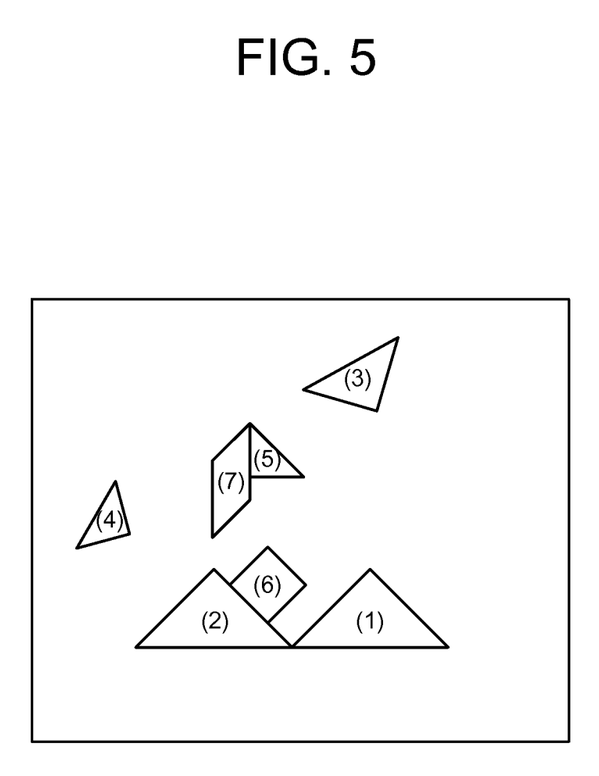
FIG. 5 a snap shot of solving a Tangram puzzle consisting of seven pieces

FIG. 5 is a snap shot of solving a Tangram puzzle consisting of seven pieces. Explanation of a Tangram puzzle will be given later. Reference domains are introduced into metal spaces of participants of dialogue either linguistically by hearing a referring expression or visually by observing a physical situation. If one says "the two big triangles" in the situation shown in FIG. 5, a reference domain consisting of pieces 1 and 2 will be recognized. If it is observed that one moves piece 1 and attaches it to piece 2, a reference domain consisting of pieces 1, 2 and 6 will be perceptually recognized due to proximity (Kristinn R. Thórisson 1994. Simulated perceptual grouping: An application to human-computer interaction. In Proceedings of the 16$^{th}$ annual Conference of the Cognitive Science Society, pages 876-881, Atlanta, Ga., USA). Hereinafter, a reference domain will be indicated with the mark @ with an index, and its elements will be denoted by enclosing them with [ ]. For example, $@_{1}=[1,2]$, $@_{2}=[1,2,6]$, and $@_{3}=[5,7]$. The focused entity is marked by '*'. Thus, foc([1*,2])=1.

The referent 1na reference domain depends on which reference domain is presupposed. That is, if one presupposes $@_{1}$ or $@_{2}$, the referent of "the right piece" should be piece 1. If one presupposes $@_{3}$, the referent of the same referring expression should be piece 5.

The above-described documents by Salmon-Art and Romary do not employ probabilistic approaches but employ approaches based on logic symbol operation.

Figure 3:
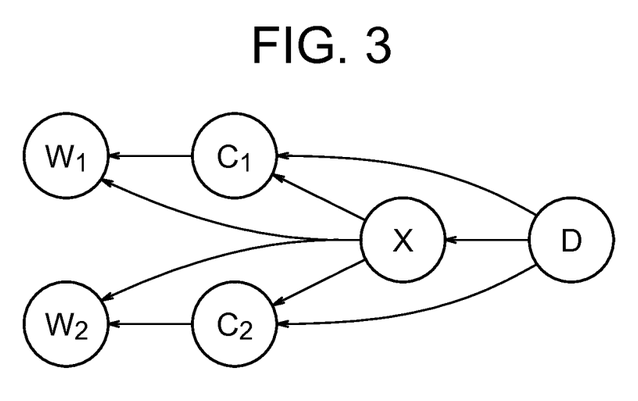
FIG. 3 shows the referring expression Bayesian network indicating one referent such as "that table"

FIG. 3 shows the referring expression Bayesian network indicating one referent such as "that table". Thus, a referring expression indicating a referent which a person recognizes as a single entity is referred to as a simple referring expression. Besides the above-mentioned example, such referring expressions as "red ball", "that married couple", "room next door" and "yesterday" are simple referring expressions.

Figure 4:
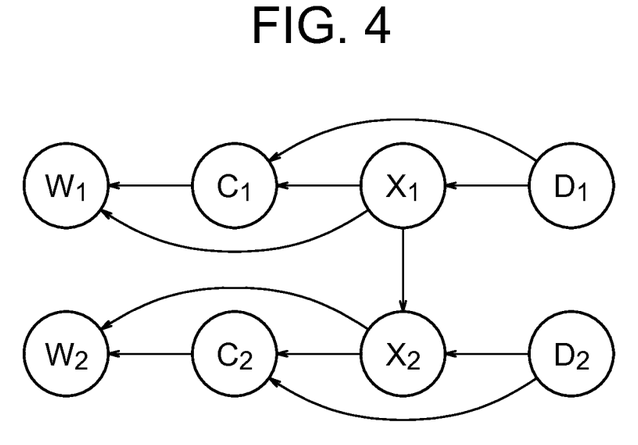
FIG. 4 shows the referring expression Bayesian network indicating two referents such as "his table"

FIG. 4 shows the referring expression Bayesian network indicating two referents such as "his table". Thus, a referring expression indicating two referents is referred to as a compound referring expression. Besides the above-mentioned example, such referring expressions as "my ball", "top of table" and "December of last year" are compound referring expressions.

Although referring expression Bayesian networks can deal with not only simple referring expressions but also compound referring expressions, a case in which simple referring expressions are dealt with will be described below for the sake of simplicity.

A referring expression Bayesian network for a simple referring expression instance of N words has 2N+2 discrete random variables: $W_1, \ldots, W_N, C_1, \ldots C_N, X$, and D. Here, $\mathfrak{D}(V)$ denotes the domain of a random variable V.

$\mathfrak{D}(W_i)$ contains the corresponding observed word $w_i$ and a special symbol word ω that represents other possibilities, i.e., $\mathfrak{D}(W_i)=\{w_i, \omega\}$.

Each $W_i$ has a corresponding node $C_i$.

$\mathfrak{D}(C_i)$ contains M concepts that can be expressed by wi and a special concept that represents other possibilities, i.e., $\mathfrak{D}(C_i)=\{c_i^1, \ldots, c_i^M, \Omega\}$.

$c_i^j (j=1 \ldots M)$ are looked up from the concept dictionary, which will be described later.

$\mathfrak{D}(D)$ contains L+1 reference domains recognized up to that point in time, i.e.

$\mathfrak{D}(D)=\{@_0, @_1, \ldots, @_D\}$.

$@_0$ is the ground domain that contains all the individual entities to be referred to in a dialogue. At the beginning of the dialogue, $\mathfrak{D}(D)=\{@_0\}$.

Other L reference domains are incrementally added in the course of the dialogue.

$\mathfrak{D}(X)$ contains al the possible referents, i.e., K individual entities and L+1 reference domains. Thus, $\mathfrak{D}(X)=\{\chi_1, \ldots, \chi_K, @_0, \ldots @_D\}$.

Reference resolution using a referring expression Bayesian network is formalized as below:

$$x' = \arg\max_{x \in \mathcal{D}(X)} P(X = x | W_1 = w_1, \ldots, W_N = w_N).$$

$$P(X | W_1, \ldots, W_N)$$

is obtained by marginalizing the joint probabilities that are computed with the probability tables described below.

Probability distributions are given as probability tables since all the random variables used in a referring expression Bayesian network are discrete. Four types of probability tables used by referring expression Bayesian networks are described below.

$P(W_i | C_i, X)$ $P(W_{i=w|Ci}=c, X=x)$ is the probability that a hearer observes w from c and x which the speaker intends to indicate.

In most cases, Wi does not depend on X, i.e., $P(W_i | C_i, X) = P(W_i | C_i)$.

X is, however, necessary to handle individualized terms (names).

There are several conceivable ways of probability assignment. One simple way is: for each $c_i^j$, $P(W=w_i | C=c_i^j) = 1/T$, $P(W=\omega|C=c_i^j)=(T-1)/T,$ and for $\Omega$, $P(W=w_{ii}|C=\Omega)=\epsilon,$ $P(W=\omega|C=\Omega)=1-\epsilon.$ Here T is the number of possible words for $c_i^j.$ $\epsilon$ is a predetermined small number such as $10^{-8}$.

$P(C_i|X,D)$ $P(C_i=c|X=x,D=d)$ is the probability that concept c is chosen from $\mathfrak{D}(C_i)$ to indicate x in d.

The developers of dialogue systems cannot provide $P(C_i|X,D)$ in advance because $\mathfrak{D}(C_i)$ is context-dependent. Therefore, an approach of composing $P(C_i|X=x,D=d)$ from $R(c_i^j,x,d)$ $(c_i^j \in \mathfrak{D}(C_i)\setminus\{\Omega\})$ is taken. Here $R(c_i^j,x,d)$ is the relevancy of concept $c_i^j$ to referent x with regard to d, and $0 \leq R(c_i^j,x,d) \leq 1.$ 1 means full relevancy and 0 means no relevancy. 0.5 means neutral. For example, when x is a suitcase, a concept BOX will have a high relevancy to x such as 0.8 while a concept BALL will have a low relevancy to x such as 0.1. If x is not in d, $R(c_i^j,x,d)$ is 0. Concept $\Omega$ will be assigned a high probability if none of $c_i^j \in \mathfrak{D}(C_i)\setminus\{\Omega\}$ has a high relevancy to x.

If $c_i^j$ is static, $R(c_i^j,x,d,I)$ is numerically given in advance in the form of a table. If not static, it is implemented as a function by the dialogue system developer, that is, $R(c_i^j,x,d)=f_{c_i^j}(x,d,I).$ Here I is all the information available from the dialogue system.

For example, given a situation such as shown in FIG. 5, the relevancy function of a positional concept LEFT can be implemented as below.

$f_{LEFT}(x,d,I)=(u_x-u_r)/(u_l-u_r)$

Here, $u_x$, $u_l$ and $u_r$ are respectively the horizontal coordinates of x, the leftmost piece in d, and the rightmost piece in d, which are obtained from I. If x is a reference domain, the relevancy is given as the average of entities in the reference domain.

$P(X|D)$ $P(X=x|D=d)$ is the probability that entity x in reference domain d is referred to, which is estimated according to the contextual information at the time the corresponding referring expression is uttered but irrespective of attributive information in the referring expression. The contextual information includes the history of referring so far (discourse) and physical statuses such as the gaze of the referrer (situation).

$P(X=x|D=d)$ is called the prediction model. The prediction model will be described in connection with experiment later.

$P(D)$ $P(D=d)$ is the probability that reference domain d is presupposed at the time the referring expression is uttered. Data to estimate this probabilistic model cannot be collected because reference domains are implicit. Therefore, three a priori approximation functions based on the saliency of d are examined. Saliency is proportional to recency. Saliency will be described in connection with experiment later.

Uniform Model

This model ignores saliency. This is introduced to see the importance of saliency.

$P(D=d)=1/|\mathfrak{D}(D)|$

Linear Model

This model distributes probabilities in proportion to saliency. "sal(d)" represents saliency of d.

$$P(D=d) = \frac{sal(d)}{\sum_{d' \in \mathfrak{D}(D)} sal(d')}$$

Exponential Model

This model puts emphasis on recent reference domains. This function is so called soft-max.

$$P(D=d) = \frac{\exp(sal(d))}{\sum_{d' \in \mathfrak{D}(D)} \exp(sal(d'))}$$

Figure 6:
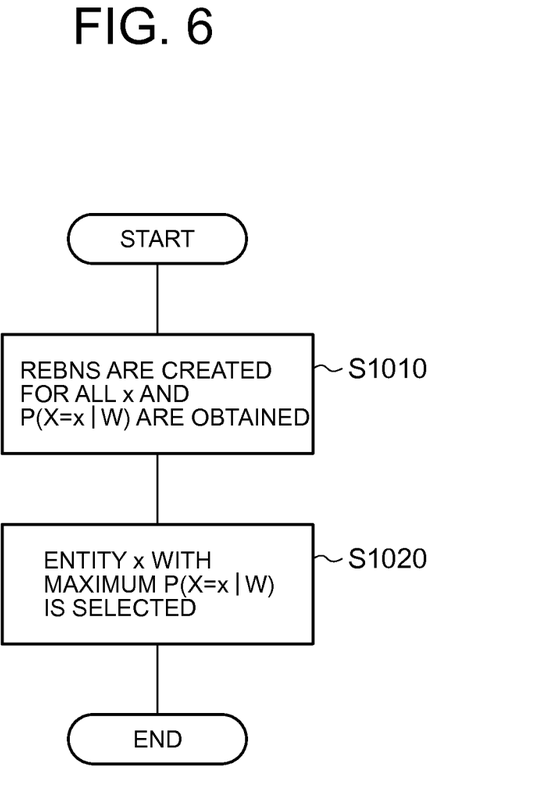
FIG. 6 a flowchart showing a process in which the referring expression processing section understands a referring expression.

FIG. 6 is a flowchart showing a process in which the referring expression processing section 101 understands a referring expression.

In step S1010 of FIG. 6, the referring expression processing section 101 creates referring expression Bayesian networks (REBN) for all possible referents x and obtains possibility $P(X=x|W)$ for each of them.

In step S1020 of FIG. 6, the referring expression processing section 101 selects x' which shows the maximum possibility as the referent of the referring expression.

Figure 7:
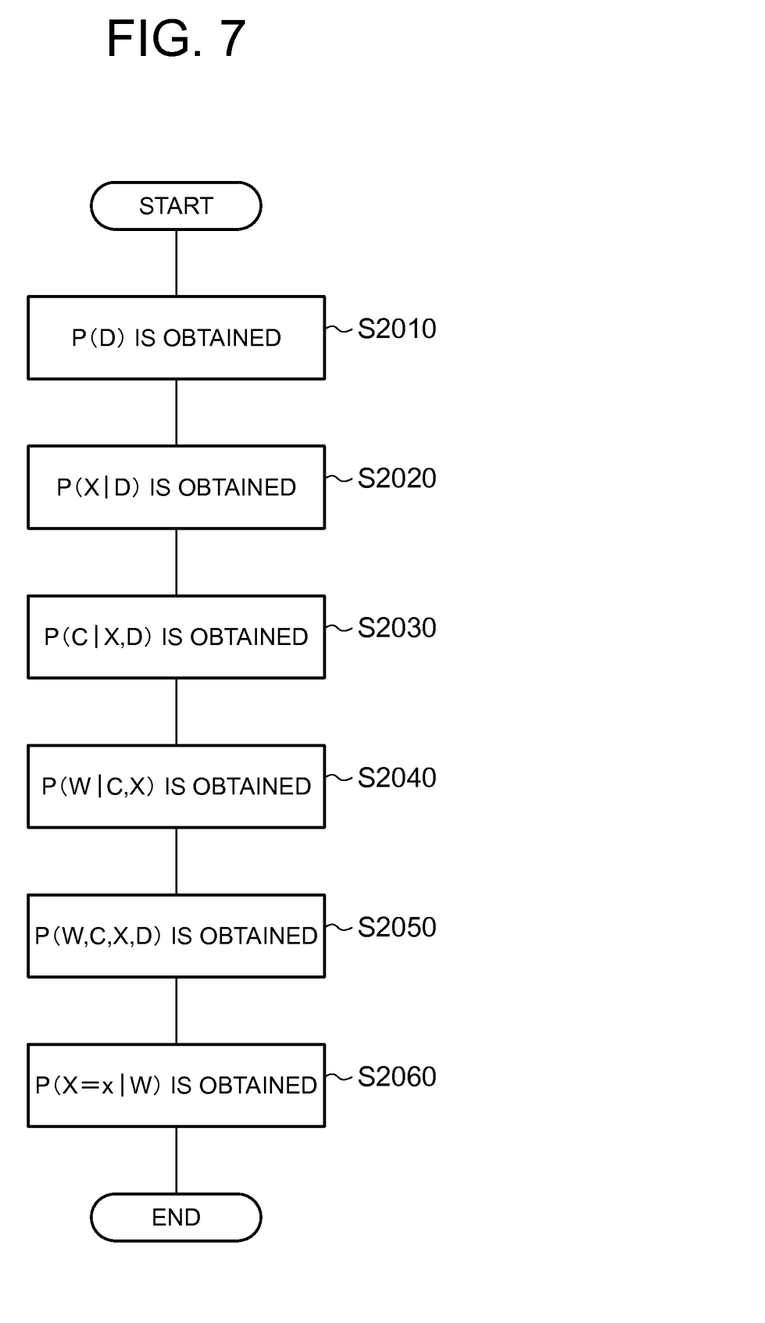
FIG. 7 a flowchart which gives detailed information of the process of step S1010 of FIG. 6.

FIG. 7 is a flowchart which gives detailed information of the process of step S1010 of FIG. 6.

In step S2010 of FIG. 7, the referring expression processing section 101 obtains P(D). A method for obtaining P(D) has been described above.

In step S2020 of FIG. 7, the referring expression processing section 101 obtains $$P(X|D).$$

The prediction model of $$P(X|D)$$

will be described later as mentioned above.

In step S2030 of FIG. 7, the referring expression processing section 101 obtains $$P(C|X,D).$$

A method for obtaining $$P(C|X,D)$$

has been described above.

In step S2040 of FIG. 7, the referring expression processing section 101 obtains $$P(W|C,X)$$

A method for obtaining $$P(W|C,X)$$

has been described above.

In step S2050 of FIG. 7, the referring expression processing section 101 obtains $$P(W,C,X,D) = P(W|C,X)P(C|X,D)P(X|D)P(D).$$

In step S2060 of FIG. 7, the referring expression processing section 101 marginalizes $$P(W,C,X,D)$$

by an existing method and obtains $$P(X=x|W).$$

Figure 8:
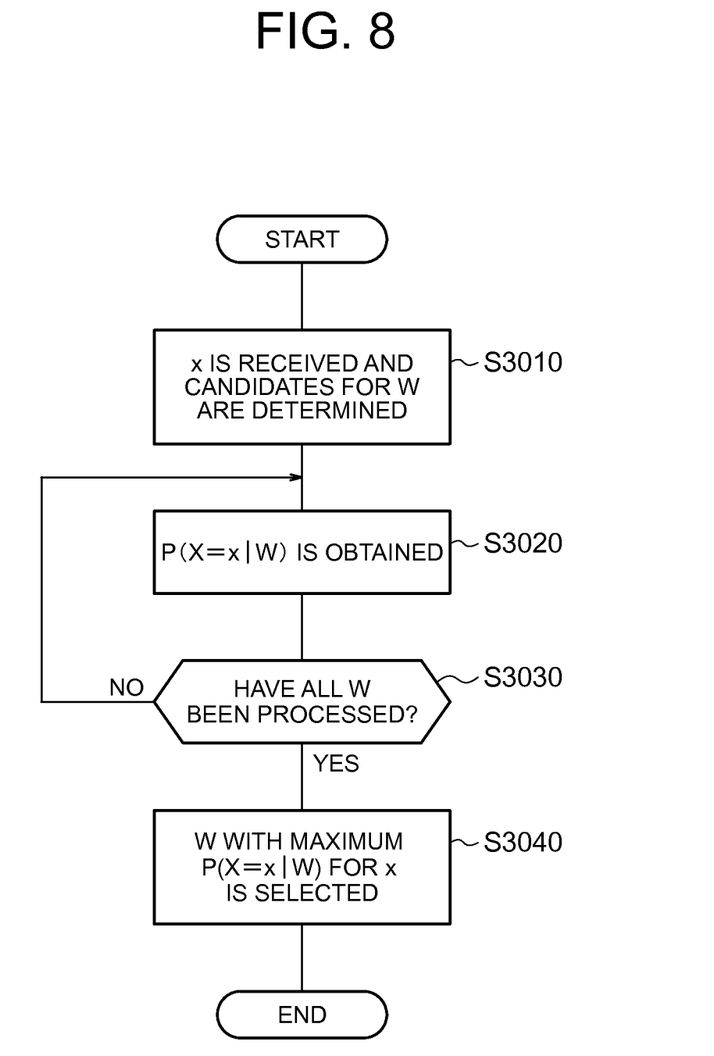
FIG. 8 a flowchart showing a process in which the referring expression processing section generates a referring expression.

FIG. 8 is a flowchart showing a process in which the referring expression processing section 101 generates a referring expression.

In step S3010 of FIG. 8, the referring expression processing section 101 receives a referent and determines candidates of w.

In step S3020 of FIG. 8, the referring expression processing section 101 obtains $$P(X=x|W)$$

using referring expression Bayesian networks by the process shown in the flowchart of FIG. 7.

In step S3030 of FIG. 8, the referring expression processing section 101 determines whether or not all W have been processed. If all W have been processed, the process goes to step S3040. If all W have not been processed, the process returns to step S3020.

In step S3040 of FIG. 8, the referring expression processing section 101 selects W which maximizes $$P(X=x|W)$$

as the referring expression.

Thus, the referring expression processor according to the present embodiment can perform both understanding and generation of referring expressions with a single probabilistic model using referring expression Bayesian networks.

Experiments for evaluating referring expression processing according to the present embodiment will be described.

As data for the evaluation, the REX-J corpus (Phlipp Spanger, Masaaki Yasuhara, Ryu Iida, Takenobu Tokunaga, Asuka Terai, and Naoko Kuriyama 2010. REX-J: Japanese referring expression corpus of situated dialog. Language Resources and Evaluation. Online First, DOI: 10.1007/s10579-010-9134-8) was used. The REX-J corpus consists of 24 human-human dialogues in each of which two participants solve a Tangram puzzle of seven pieces shown in FIG. 5. The goal of the puzzle is combining seven pieces to form a designated shape. One of two subjects takes the roll of operator (OP) and the other takes the roll of solver (SV). The OP can manipulate the virtual puzzle pieces displayed on a PC monitor by using a computer mouse but does not know the goal shape. The SV knows the goal shape but cannot manipulate the pieces. The states of the pieces and the mouse cursor operated by the OP are shared by the two subjects in real time. Thus, the two participants weave a collaborative dialogue including many referring expressions to the pieces. In addition to referring expressions, the positions and directions of the pieces, the position of the mouse cursor, and the manipulation by the OP were recorded with timestamps and the IDs of relevant pieces.

Table 1 shows referring expressions. In the table each of the referring expressions is shown with its referent. The first referring expression okküsankaku big triangle "a big triangle" in the table is ambiguous and refers to either piece 1 or 2. The seventh and eighth referring expressions refer to the set of pieces 1 and 2. The other referring expressions refer to an individual piece.

TABLE 1

| D-ID | Role | Start | End | Referring expression | Referents | Intermediate structure |
|------|------|-------|-----|---------------------|-----------|------------------------|
| 0801 | SV | 17.345 | 18.390 | okkiisankaku big triangle | 1 or 2 | (okkii sankaku) |
| 0801 | SV | 20.758 | 21.368 | sore it | 1 | (sore) |
| 0801 | SV | 23.394 | 24.720 | migigawanookkiisannkaku right big triangle | 1 | (migigawano okkii sannkaku) |
| 0801 | SV | 25.084 | 25.277 | kore this | 1 | (kore) |
| 0801 | SV | 26.512 | 26.671 | sono that | 1 | (sono) |
| 0801 | SV | 28.871 | 29.747 | konookkiisannkaku this big triangle | 2 | (kono okkii sannkaku) |
| 0801 | OP | 46.497 | 48.204 | okkinasankakkei big triangle | 1, 2 | (okkiina sankakkei) |
| 0801 | OP | 51.958 | 52.228 | ryôhô both | 1, 2 | (ryôhô) |

To avoid problems due to errors in structural analysis the corpus has been annotated with intermediate structures (REX-graphs), from which referring expression Bayesian networks are constructed. The intermediate structures are shown as parenthesized lists of separated words.

BNJ (http://bnj.sourceforge.net/) is used for probabilistic computation. Implementations that are more or less specific to the task domain of REX-J will be described below.

Figure 9:
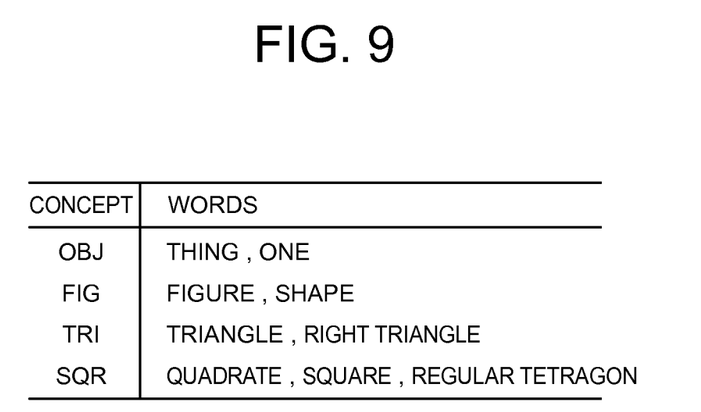
FIG. 9 shows an excerpt of the concept dictionary for REX-J.

FIG. 9 shows an excerpt of the concept dictionary for REX-J. 40 concepts were defined by observing dialogues.

Figure 10:
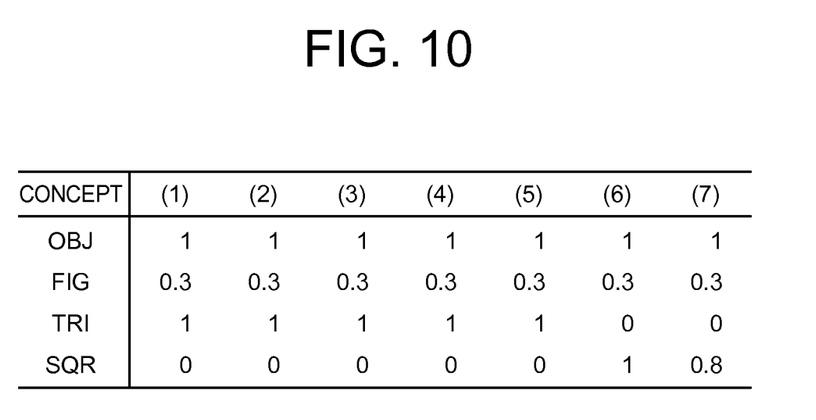
FIG. 10 shows an excerpt of the static relevancy table defined for seven pieces shown in FIG. 5.

FIG. 10 shows an excerpt of the static relevancy table defined for seven pieces shown in FIG. 5. For 13 concepts out of 40, their relevancy values were determined. OBJ is equally and fully relevant to all the pieces, FIG is equally but not very relevant to all the pieces, TRI is relevant only to pieces 1 to 5, and SQR is relevant only to pieces 6 and 7 but is not totally relevant to piece 7 because it is not a square in a precise sense.

Relevancy functions were implemented for the remaining 27 concepts. Some of them will be described below.

Another

Among entities of a reference domain d, the focused entity is represented as focus(d).

$$P(C_{ANOTEHR} = \text{true} \mid X = x, D = d) = \begin{cases} 1: & \text{if } \text{focus}(d) \neq x \text{ and } x \in d \\ 0: & \text{otherwise} \end{cases}$$

Rest

Only when a reference domain has two groups as entities, as shown below, relevancy of the group which is not focused is set to 1. Otherwise, relevancy is set to 0.

$$@_o = [@_{m^*}, @_n]$$

$$P(C_{REST} = \text{true} \mid X = @_n, D = @_o) = \begin{cases} 1: & \text{if } @_o = [@_{m^*}, @_n] \\ 0: & \text{otherwise} \end{cases}$$

Both

When x is a group which has two entities, relevancy is set to 1.

$$P(C_{BOTH} = \text{true} \mid X = x, D = d) = \begin{cases} 1: & \text{if } |x| = 2 \\ 0: & \text{otherwise} \end{cases}$$

FIG

This expression refers to a group of combined pieces. When x is a single piece (single(x)=true), relevancy is set to a value r obtained from the static relevancy table. When x is a group of pieces connected to form a shape (shape (x)=true), relevancy is set to 1.

$$P(C_{FIG} = \text{true} \mid X = x, D = d) = \begin{cases} r: & \text{if } \text{single}(x) \\ 1: & \text{if not single}(x) \text{ and shape}(x) \\ 0: & \text{otherwise} \end{cases}$$

All

Assume that each reference domain includes a special reference to itself (self-reference) as an entity. That is, $$@_m = [c_1, c_2, \ldots, c_n, @_m].$$

Under the situation, $$P(C_{ALL} = \text{true} \mid X = x, D = d) = \begin{cases} 1: & \text{if } x = d \\ 0: & \text{otherwise.} \end{cases}$$

A list of reference domains will be described below. In the course of reference resolution (understanding of referring expressions), reference domains are added into a list and updated by the following procedure. In the list, reference domains are sorted in descending order according to saliency.

Assume that at each time of reference resolution, all the previous reference expressions are correctly resolved. Therefore, after each time of resolution, if the correct referent of the last referring expression is a set, a new reference domain equivalent to the set is added into the list of reference domains, unless the list contains another equivalent reference domain already. In either case, the saliency of the reference domain equivalent to the set is set to σ+1 unless the reference domain is at the head of the list already. Here, σ is the largest saliency value in the list, that is, the saliency value of the head reference domain at the moment.

Before each time of reference resolution, it is checked whether the piece that is most recently manipulated after the previous referring expression constitutes a perceptual group by using perceptual grouping described later at the onset time of the target referring expression. If such a group is recognized, a new reference domain equivalent to the recognized group is added into the list of reference domains unless the list contains another equivalent reference domain. In either case, the saliency of the reference domain equivalent to the group is set to σ+1 unless the reference domain is at the head of the list already, and the focus of the equivalent reference domain is set to the most recently manipulated piece.

When a new reference domain $@_m$ is added to the list, a complementary reference domain $@_n$ and a submerging reference domain $@_l$ are also inserted after $@_m$ in the list. Here, $$@_n = @_o \backslash @_m$$

and $$@_l = [@_m^* \cdot @_n].$$

This operation is required to handle a concept REST,

Perceptual grouping will be described below. Here, when the minimum distance between two pieces is not greater than a predetermined value, the two pieces are regarded as being in contact with each other, and only sets of pieces being in contact with one another are recognized as groups. This method is less general but works satisfactorily in the REX-J domain due to the future of the Tangram puzzle.

Figure 11:
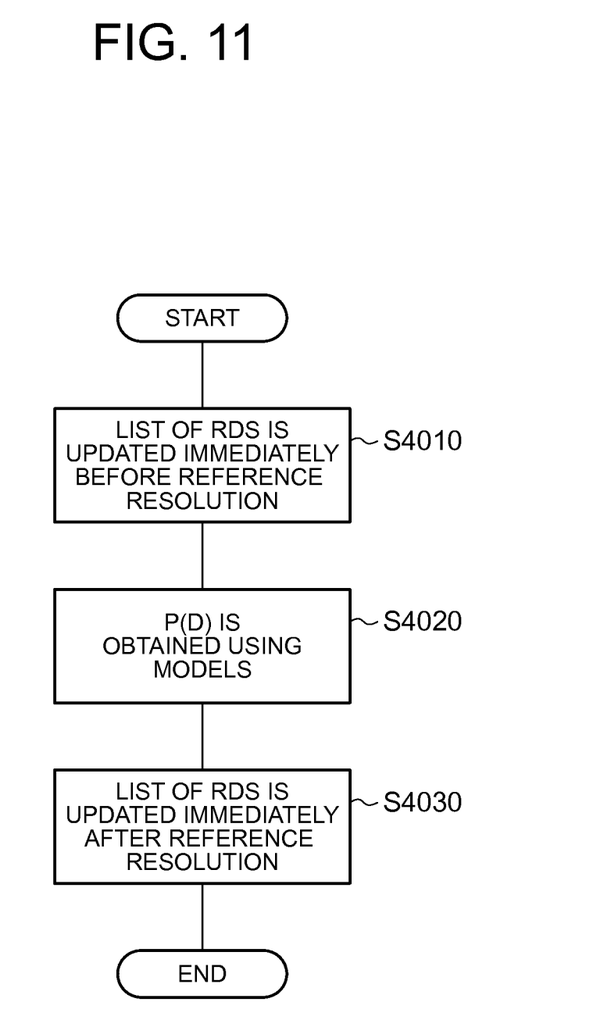

FIG. 11 is a flowchart showing a method in which

P(D)

is obtained using the list of reference domains. This process can be performed by the dialogue managing section 109.

In step S4010 of FIG. 11, the dialogue managing section 109 updates the list of reference domains based on the results of perceptual grouping immediately before reference resolution performed by the referring expression processing section 101.

In step S4020 of FIG. 11, the referring expression processing section 101 puts a saliency obtained from the list of reference domains into the above-described models of saliency to obtain

P(D).

In step S4030 of FIG. 11, the dialogue managing section 109 updates the list of reference domains according to the results of referring expression immediately after reference resolution performed by the referring expression processing section 101.

For constructing the prediction model $$P(X|D)$$

which has been described above, a ranking-based method (Ryu IIDA, Shumpei Kobayashi, and Takenobu Tokunaga. 2010. Incorporating extra-linguistic information into reference resolution in collaboration task dialogue. In *Proceedings of the 48th Annual Meeting of the Association for Computational Linguistics*, pages 1259-1267, Uppsala, Sweden, July) using SVM$^{rank}$ (Thorsten Joachism. 2006. Training linear SVMs in linear time. In *Proceedings of the ACM Conference on Knowledge Discovery and Data Mining (KDD)*, pages 217-226, Philadelphia, Pa., USA, August) was adopted. This model ranks entities according to 16 binary features such as whether the target entity is previously referred to (a discourse feature), whether the target is under the mouse cursor (a mouse cursor feature), etc.

When a target is a set, i.e., a reference domain, discourse features for it are computed as in the case of a piece; meanwhile, mouse cursor features are handled in a different manner. That is, if one of the group members meets the criterion of a mouse cursor feature, the group is judged as meeting the criterion.

Rank is represented as $$\text{rank}(x,\theta)$$

θ is contextual information.

$$P(X=x|D=d;\theta)$$

is obtained by the following equation using rank.

$$P(X = x | D = d; \theta) = \begin{cases} N/(1 + \exp(-\text{rank}(x, \theta))): & x \in d \\ 0: & x \notin d \end{cases}$$

Here, $$N$$

is a normalization factor to realize $$\Sigma_{x \in d} P(X=x|D=d;\theta)=1$$

If x does not exist in d, $$P(X=x|D=d)$$

is 0.

The 24 dialogues were used for evaluation. These 24 dialogues contain 1474 simple referring expression instances and 28 compound referring expression instances. In addition to compound referring expressions, referring expressions mentioning complicated concepts, for which it is difficult to implement relevancy functions in a sort time were excluded. After excluding those referring expressions, 1310 referring expressions were available. Out of the 1310 referring expressions, 182 referring expressions (13.2%) refer to sets, and 612 referring expressions are demonstrative pronouns such as sore "it".

The following conditions were presupposed.

Speaker Role Independence

It was assumed that referring expressions are independent of speaker roles, i.e., SV and OP. All referring expressions were mixed and processed serially.

Perfect Preprocessing and Past Information

It was assumed that no error comes from preprocessing including speech recognition, morphological analysis, and syntactic analysis' and all the correct referents of past are known.

No Future Information

In human-human dialogue, sometimes information helpful for resolving a referring expression is provided after the referring expression is uttered. However, such future information is not considered.

Numeral Information

Many languages including English grammatically require indication of numeral distinctions by using such as articles, singular/plural forms of nouns and copulas, etc. Although Japanese does not have such grammatical devices, it would be possible to predict such distinctions by using a machine learning technique with linguistic and gestural information. Therefore the effect of providing such information was observed. In the following experiment the singular/plural distinctions were provided to expression Bayesian networks by looking at the annotations of the correct referents in advance. This is achieved by adding a special evidence node $C_0$, where $$\mathfrak{D}(C_0)=\{S,P\}.$$

$$P(C_0=S|X=x)=1$$

and $$P(P|X)=0$$

if x is a piece. On the contrary, $$P(S|X)=0$$

and $$P(P|X)=1$$

if x is a set.

As a baseline of the experiment, a $$P(D)$$

model, which is called Mono-domain was prepared. In Mono-domain, $$\mathfrak{D}(D)$$

consists of a single reference domain $$@'_0$$

which contains individual pieces and the reference domains recognized up to that point in time. That is, $$@'_0 = \mathfrak{D}(X)$$

In the experiment, in the case that referring expressions contain a demonstrative, better performance was obtained when Mono-domain was used than when reference domains obtained by the above-described models were used. Whenever referring expressions contain a demonstrative, Mono-domain was used to obtain the following results.

Table 2 shows results of the experiment. The performance of reference resolution is presented by category and by condition in terms of accuracy. The accuracy is a ratio of the number of correctly resolved referring expressions to the number of referring expressions.

TABLE 2

| P(D) model | Mono-domain | | | Uniform | | | Linear | | | Exponential | | |
|---|---|---|---|---|---|---|---|---|---|---|---|---|
| Category | Single | Plural | Total | Single | Plural | Total | Single | Plural | Total | Single | Plural | Total |
| w/o S/P info. | 77.5 | 47.3 | 73.3 | 77.1 | 40.6 | 72.0 | 78.3 | 45.1 | 73.7 | 76.2 | 48.4 | 72.3 |
| w/ S/P info. | 84.8 | 58.8 | 81.2 | 84.4 | 55.0 | 80.3 | 85.6 | 61.0 | 82.1 | 83.4 | 68.1 | 81.3 |

In evaluation, three categories were set up, that is, Single, Plural and Total Category Single is the collection of referring expressions referring to a single piece. Plural is the collection of referring expressions referring to a set of pieces. Total is the sum of them. Ambiguous referring expressions such as the first one in Table 1 are counted as "Single" and the resolution of such a referring expression is considered correct if the resolved result is one of the possible referents.

"w/o S/P info." indicates experimental results without single/plural distinction information. "w/S/P info." indicates experimental results with it. Obviously S/P information has a significant impact.

While the best performance for category Single was achieved with the Linear model, the best performance for Plural was achieved with the Exponential model If it is possible to know whether a referring expression is of Single or Plural, that is, S/P information is available, a suitable P(D) model can be selected. Therefore, by switching models, the best performance of Total with S/P information reached 83.2% and a gain of 2.0% was achieved (sign test, p<0.0001).

By introducing referring domains, resolution in category Plural achieved a significant advancement. The highest gain from the baseline was 9.3 points (sign test, p<0.005).

Moreover, more referring expressions containing positional concepts such as LEFT and RIGHT were correctly resolved in the cases of Uniform, Linear and Exponential Table 3 summarizes the resolution results of four positional concepts with S/P information. Numerical values in Table 2 indicate the total number of referring expressions and the number of correctly resolved referring expressions. While the baseline resolved 65% of them, the Liner model correctly resolved 75% (sign test, p<0.05).

TABLE 3

| Concept | Count | Mono | Uni. | Lin. | Exp. |
|---|---|---|---|---|---|
| LEFT | 21 | 11 | 12 | 16 | 13 |
| RIGHT | 33 | 23 | 23 | 25 | 27 |
| UPPER | 9 | 6 | 6 | 6 | 4 |
| LOWER | 6 | 5 | 4 | 5 | 4 |
| Total | 69 | 45 | 45 | 52 | 48 |

At each time of resolution, a dedicated Bayesian network is constructed for the referring expression in question. The constructed Bayesian network deals with either descriptive, deictic or anaphoric referring expressions in a unified manner. Referring expression Bayesian networks incorporate the notion of reference domains, which enables the resolution of referring expressions with context-dependent attributes and handling of referring expressions to sets. Referring expression Bayesian networks have the potential to be a standard approach that can be used for any and all task-oriented applications such as personal agents in smart phones, in-car systems, service robots, and the like.

What is claimed is:

1. A referring expression processor comprising:
a referring expression processing section which performs understanding of referring expressions using a probabilistic model constructed with a referring expression Bayesian network, each referring expression Bayesian network representing relationships between a reference domain (D) which is a set of possible referents, a referent (X) in the reference domain, a concept (C) concerning the referent and a word (W) which represents the concept; and
a memory which stores data necessary for constructing the referring expression Bayesian network,
wherein the understanding of referring expressions comprises obtaining a probability P(X|W) by
obtaining a probability P(D),
obtaining a probability P(X|D),
obtaining a probability P(C|X,D),
obtaining a probability P(W|C,X),
obtaining a probability P(W,C,X,D) based on the probability P(D), the probability P(X|D), the probability P(C|X,D), and the probability P(W|C,X), and
marginalizing the probability P(W,C,X,D).

2. A referring expression processor according to claim 1, wherein each referring expression Bayesian network is constructed in the course of dialogue each time a referring expression is processed.

3. A referring expression processor comprising according to claim 2, wherein a way of determining the reference domain is changed depending on types of referring expressions.

4. A referring expression processor according to claim 3, wherein the reference domain is determined to include all elements when a referring expression contains a demonstrative.

5. A referring expression processor according to claim 3, wherein a plurality of prediction models for reference domains which have saliency as a parameter are constructed, and one of the plurality of prediction models is selected for use depending on whether a referring expression refers to a single entity or a set of entities.

6. A language processor comprising the referring expression processor according to claim 1.

7. A method for processing a referring expression, comprising the steps of:
constructing, by a referring expression processing section of a language processor, a referring expression Bayesian network representing relationships between a reference domain (D) which is a set of possible referents, a referent (X) in the reference domain, a concept (C) concerning the referent and a word (W) which represents the concept using data stored in a memory;
obtaining, by the referring expression processing section, a probability P(X|W) by obtaining a probability P(D), obtaining a probability P(X|D), obtaining a probability P(C|X,D), obtaining a probability P(W|C,X), obtaining a probability P(W,C,X,D) based on the probability P(D), the probability $P(X|D)$, the probability $P(C|X,D)$, and the probability $P(W|C,X)$, and marginalizing the probability $P(W,C,X,D)$; and obtaining, by the referring expression processing section, x' which maximizes the probability $P(X|W)$ to select x' as the referent of the referring expression.

* * * * *